Aug. 9, 1932.  W. C. PITTER  1,870,646
SPRING CLUTCH DEVICE
Filed Dec. 20, 1930  2 Sheets-Sheet 1

Inventor
Walter Charles Pitter
By Luther Johns
Atty.

Aug. 9, 1932.  W. C. PITTER  1,870,646
SPRING CLUTCH DEVICE
Filed Dec. 20, 1930  2 Sheets-Sheet 2
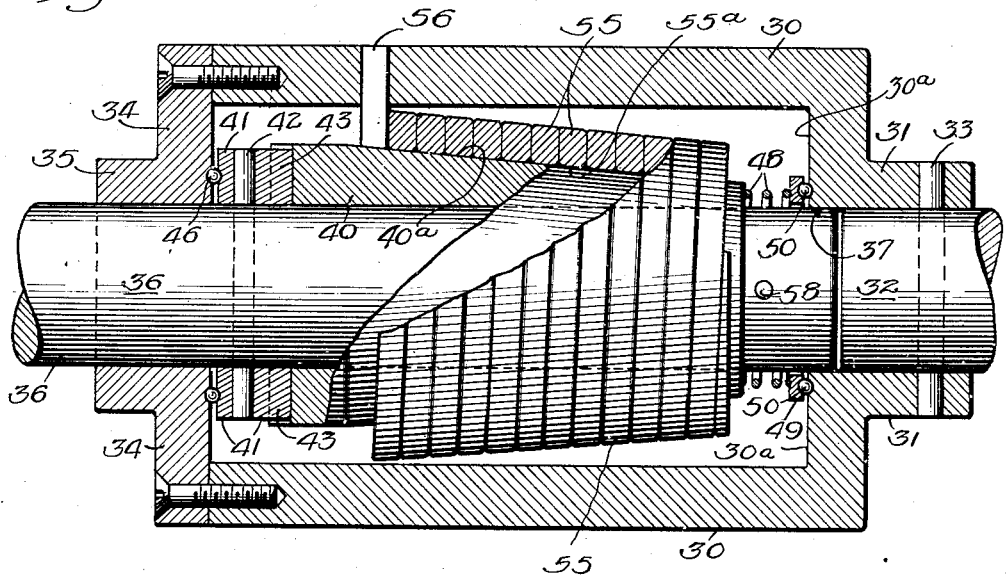
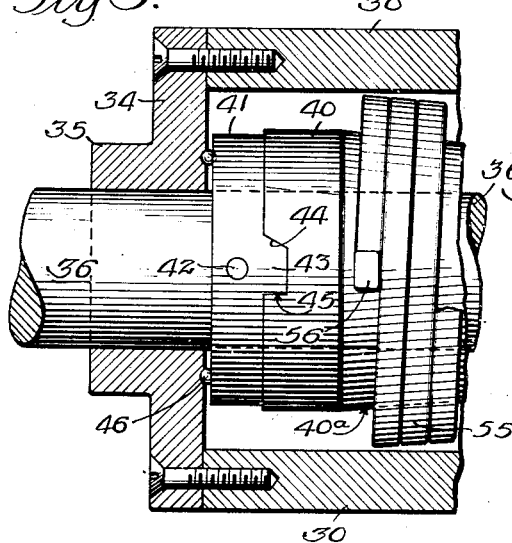
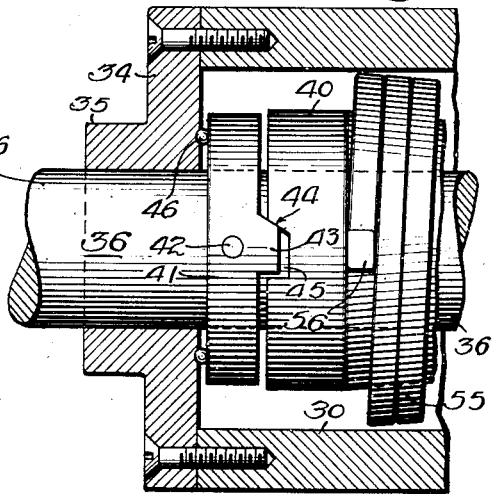
Inventor
Walter Charles Pitter
By Luther Johns
atty.

Patented Aug. 9, 1932

1,870,646

UNITED STATES PATENT OFFICE

WALTER CHARLES PITTER, OF EPPING, ESSEX, ENGLAND, ASSIGNOR TO THE PITTER TRUST, OF CHICAGO, ILLINOIS, A COMMON LAW TRUST

SPRING CLUTCH DEVICE

Application filed December 20, 1930. Serial No. 503,672.

These improvements relate to rotating shaft clutches of the general type in which a coiled spring carried by one main member is in close interfitting association with the other main member and through the expansion or contraction of the spring, as the case may be, it becomes bound upon the other member and the two are locked in driving and driven relation respectively in one direction of the driving shaft's rotation.

Clutches of the general type referred to are well known at this time. In the old forms with which I am familiar the coiled spring is of cylindrical shape and fits fairly snugly either within a cylindrical recess or upon a cylindrical stem.

Since the coil has screw-thread properties, the rotative movement of either one of the members relative to the other in one direction tends to cause the spring to tighten upon the other member. When the driving power ceases the driven member may continue to rotate in the same direction. Either of the main members may be the driving or the driven member.

The chief difficulty with the old construction thus far described is with respect to the slippage that occurs in getting the initial expansion or contraction of the spring started and this slippage is sometimes very considerable. It is also very erratic—sometimes more and sometimes less, and developing at various intervals of time. It happens too that in certain relations of one member to the other slippage is more pronounced than in other relations, probably due to inequalities in wear or in manufacture. For even ordinary results the parts must be formed with notable precision.

The prime object of the present invention is to provide a spring clutch device of the general type described which is substantially instantaneous in action, affords a strong and positive grip and is highly reliable. It is an object to provide a device of these characteristics in a small, compact and unitary form. Other objects and advantages will appear hereinafter.

In the drawings Figure 1 is an elevation of my new clutch device with the conically-shaped spring member fitting within a similarly-shaped recess in the other member.

Fig. 4 is a view similar to Fig. 2 showing a modified form in which the conical spring member fits upon a conical stem, and there are cam means for causing the initial binding action to take place;

Fig. 5 is a fragmentary section following Fig. 4, with the inner member turned ninety degrees; and Fig. 6 is a view following Fig. 5 and showing the effects of a slight rotative movement of one member relative to the other in one direction.

Figure 1:
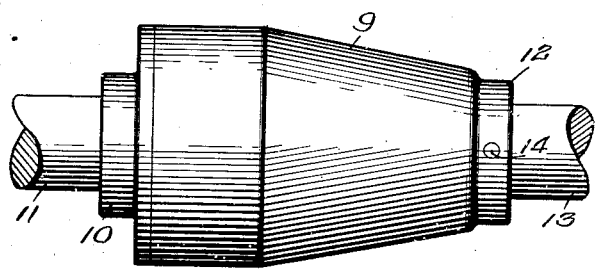
Figure 2:
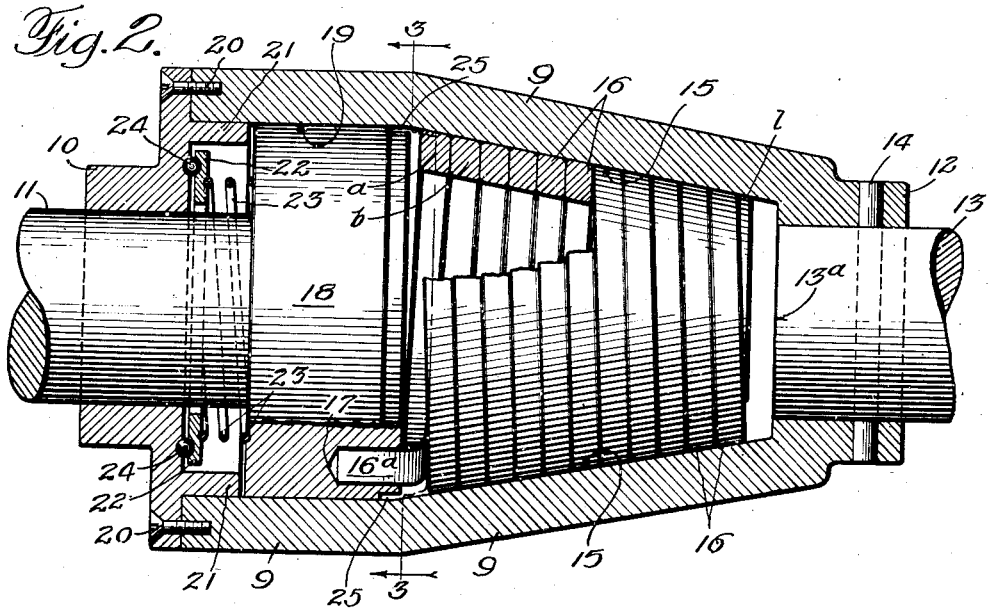
Fig. 2 is a medial vertical longitudinal section, on an enlarged scale, through the outer member of the device of Fig. 1, with the parts of the inner member broken away.
Figure 3:
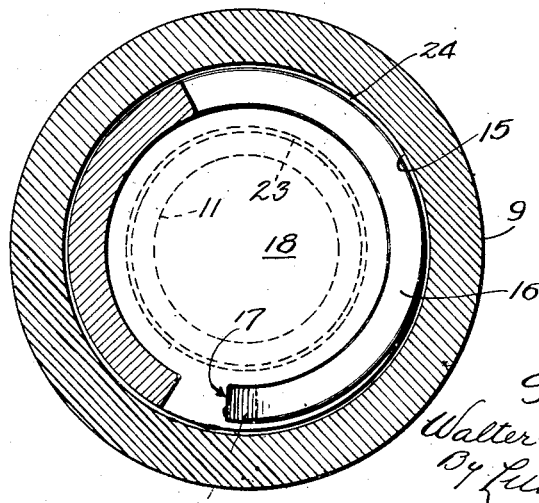
Fig. 3 is a cross-sectional view on the line 3—3 of Fig. 2.

The device illustrated in Figs. 1, 2 and 3 comprises an outer main member comprising a shell-like part 9 having at one end a removable hub member 10 into which the shaft 11 extends for free rotation and at its other end an integral hub 12 into which shaft 13 extends and to which shaft this outer body is held as by a through pin 14. The shell 9 has an inner wall or surface defining a recess 15 having the shape of a truncated cone and being on the axis of shafts 11 and 13.

Fitting within this conical recess 15 is a conical spiral spring 16. The end 16a of spring 16 extends at right angles from the first turn and fits into a hole 17 in a cylindrical member 18 which is integral with shaft 11, this member 18 interfitting for rotative movement with the cylindrical inner surface 19 of the shell.

Hub member 10 is held by screws 20 at the end of shell 9. A cylindrical flange 21 on hub member 10 serves as a stop to limit the movement of member 18 in the outward direction to a substantially small amount.

A ring 22 forms a seat for the coiled expansion spring 23 seated against member 18, and between ring 22 and hub 10 is a race containing balls 24.

Since shaft 11 is shown integral with cylindrical member 18 this shaft 11 becomes a part of the clutch device. On it may be secured a gear, pulley, lever, etc., or it may be connected by means of a coupling to some other shaft. It need not, however, be a part of the clutch device unit. Shaft 13 terminates at 13a and may be considered the shaft of a machine to which the clutch is connected, or it may be considered a part of the clutch device. Either shaft 11 or 13 may be the driving shaft.

Coiled spring 23 operates to force bearing member 18 toward the right as viewed in Fig. 2. At 25 I have shown an annular clearance in member 18 to permit its forward movement since the slanting surface 15 is shown as beginning at about the inner surface of member 18.

If we assume shaft 13 to be the driving shaft and turning anticlockwise as the device is illustrated in Fig. 3, shell 9 moves anticlockwise over the outer periphery of main spring 16 in such direction as to tend to cause the shell to unthread from this spiral spring. It does not actually unthread—merely slips over the outer surface—but the frictional effect is such as to tend to cause the spring 16 to become smaller in diameter as to each turn. In any event the tendency is not to cause spring 16 to become any larger; and shell 9 therefore moves freely on spring 16.

If, however, shaft 13 be turned in the clockwise direction as the device is viewed in Fig. 3 the tendency of the frictional resistance between the spring and the shell is to cause the shell to thread itself upon the spring. The expansion spring 23 is constantly operating to maintain a snug fit between shell 9 and spring 16. There is a film of oil between the shell and the spring but otherwise they are maintained in face to face contact through the action of spring 23 and the conical construction. Now when shell 9 is turned so as to tend to thread itself upon coil 16, as I understand the action to be, the friction developed all over the outer surface of the spring tends to turn the entire spring bodily, and all parts of it simultaneously, in the same direction. This force is communicated at once to the anchoring element 16a, and resistance is there encountered to such turning movement. This causes the spring to begin to expand in the first or inner turn a, which thereby becomes locked in recess 15. Now, since turn a offers resistance to the described tendency to turn the spring, turn b expands, and so on, and thus a locking expansion runs in a wave from inner turn a to the last turn of the coil marked 1, which is free of connection with any member.

Because of the conical construction and the tensioning spring 23 friction is developed over the entire surface of spring 16. This friction is so great, speaking relatively, that apparently the slightest movement in the clutching direction causes the expansion to begin. In fact the locking expansion takes place practically simultaneously from one end of the spring to the other before what I have described as a wave of expansion takes place, that wave being more in the nature of a strain imposed upon the spring already in locked relation with the shell. That wave of expansion is advantageous in view of any slight inequalities between the coacting surfaces due to manufacture or wear and being of such nature that here and there a coil may not come into the strongest locking effect at the first instance. In such case various waves may be started, beginning at various places along spring 16.

We are dealing here with an exceedingly small space of time—only an instant. What takes place or may take place has been theoretically described according to my present understanding. The practical effect is a substantially instantaneous, powerful and reliable interlock between the two members.

When the driving power is discontinued the driven member may continue to rotate in the same direction. At such time the relative rotative movement between the members at the expansion spring 23 is on the bearing elements 24, thus reducing friction and wear.

Turning now to Figs. 4, 5 and 6 the cylindrical shell 30 has a hub 31 in which extends the shaft 32 held by pin 33. The other end of the housing 30 is closed by a readily-removable circular plate 34 having a hub 35 in which rotates freely the shaft 36, this shaft having a bearing at 37 in hub 31. Mounted for longitudinal movement on shaft 36 is a conically-shaped member 40 which is either turned by shaft 36 or which turns shaft 36 according to the application of power. The connection between member 40 and shaft 36 comprises a collar-like member 41 held on shaft 36 by pin 42 and having a pair of cam elements 43 one hundred and eighty degrees apart, each cam element having a slanting surface at 44. The member 40 has a recess marked as a whole 45 which, as shown in Fig. 5, is the exact counterpart of cam member 43, the cam 43 fitting into the recess 45. A race of balls 46 is between the collar-like member 41 and the plate-like member 34.

Fig. 4 shows a coiled expansion spring 48 having but little force and bearing against a ring 49 which bears against the end of member 40 and also against a ring 49 having a race of balls 50 bearing against the end 30a of housing 30. The spring 48 tends to maintain the cam 43 and recess 45 in the relation shown in Fig. 5.

If the cone-shaped member 40 be turned in one direction relative to shaft 36 the slanting surfaces at 44 will cause the member 40 to move to the right in the several figures, or into the relative position shown by Fig. 6.

The housing 30 carries a conically-shaped spiral spring 55 by means of an extension 56 of the spring secured to the housing, the other end of the coil being free. This coil 55 has an inner surface 55a fitting accurately upon the outer surface 40a of member 40.

Assuming shaft 36 to be the driving shaft and assuming it to be turning in the clockwise direction as viewed from the left-hand end of Fig. 5, the square shoulder at the arrow point 45 in Fig. 5 would drive member 40 in a direction relative to spring 55 tending to enlarge the spring and no gripping or clutching action would occur. However, if shaft 36 were turned anticlockwise as viewed from the left hand end of Fig. 5 the cam surfaces at 44 would cause longitudinal displacement of member 40 on shaft 36 as shown in Fig. 6, which causes the plug-like member 40 to fit more tightly within spring 55. The spring 55 will not be enlarged by the action of cam 43 for several reasons. First because of its inherent resistance, and secondly as soon as member 40 is brought into good frictional relation with spring 55 the binding action takes place, owing to the direction of driving movement, and the spring becomes tightly bound on member 40. The longitudinal movement of member 40 is therefore limited by the inherent characteristics of the device, but to prevent undue longitudinal movement of member 40 I provide a stop, which may be in the form of a pin 58 in shaft 36.

Spring 55 and member 40 are in a close sliding fit with each other when spring 48 has pressed member 40 to the left as far as possible. Owing to the film of oil between spring 55 and member 40 there is sufficient frictional drag between the members to start the clamping action, subject to some delay or slippage. As soon, however, as member 40 is turned in the clutching direction its longitudinal displacement through the cam action causes an immediate and strong gripping action to take place.

As the device is illustrated in Figs. 4, 5 and 6, shaft 36 is preferably the driving shaft since the inertia of member 40 cooperates to cause its longitudinal displacement by the cam and therefore an immediate and strong gripping action.

I contemplate as being included in these improvements all such changes, variations and departures from what is thus specifically illustrated and described as fall within the scope of the appended claims.

I claim:

1. A rotary clutch of the character described comprising an outer shell-like member having an inner wall defining a conical recess on the axis of the device closing walls at each end of said shell-like member, an inner member mounted to rotate within and relative to the outer member on the axis of the device, a conically-shaped coiled spring anchored at one end to the inner member and fitting into the conical recess of the outer member, means within the shell holding the members against material longitudinal displacement relative to each other, and means for yieldingly maintaining the spring in close-fitting relation with the wall defining said recess.

2. A clutch comprising rotary coaxial driven and driving members, one of which consists of a shell having a head at each end, a driving shaft and a driven shaft projecting from the shell at opposite ends, one of said members also comprising a part with a truncated conical surface in the interior of the shell, a helical conical spring closely adjacent to said surface over its entire length, said spring being anchored at its large end to one of said members while the reduced end is loose, and axially operative yielding means interposed between one of said heads and one of said members and located within the interior of the shell for normally retaining said members in a predetermined relation.

3. A friction clutch comprising a rotary shell-like member closed at both ends, coaxial driving and driven shafts projecting from opposite ends of the shell, a companion clutch member in the interior of the shell, one of said members having in the interior of the shell a truncated conical surface coaxial with the shell, and a spring entirely within the shell and closely adjacent said conical surface, the spring being free at the reduced end but anchored at the larger end fixedly to that member which does not have the said conical surface, whereby upon relative rotation of one member to the other in a predetermined direction, said spring is forced into gripping engagement with said conical surface over its entire length.

4. A clutch comprising a conical shell closed at both ends, coaxial driving and driven shafts projecting from the closed ends of the shell, a conical spring closely adjacent the inner wall of said conical shell, over the entire length of the spring, a head in the interior of the shell fixed to one of said shafts, the spring being anchored at its larger end to said head, and means in the interior of the shell for normally constraining said head to move in axial direction relatively of the shell, whereby said spring on its outer circumference is forced into gripping engagement with the inner conical surface of the shell.

5. A clutch comprising a conical shell closed at both ends, coaxial driving and driven shafts projecting from the closed ends of the shell, a helical conical spring in the interior of the shell, one of the shafts having within the interior of the shell an enlarged head to which the larger end of the conical spring is anchored, while the other end of said spring is loose within the shell, and another spring in the interior of the shell interposed between one end thereof and the head on the shaft, and adapted to yieldingly force said head in a direction towards the reduced end of the spring for normally urging the outer circumference of the spring into gripping engagement with the inner conical surface of said shell.

6. A clutch comprising a cylindrical shell closed at both ends, coaxial driving and driven shafts projecting through said ends, a conical member coaxial with the shafts and adapted to be driven by one of them, and a helical conical spring loosely surrounding said conical member closely adjacent thereto, but anchored to the shell, said spring and conical member being located entirely within the shell.

7. A clutch comprising a cylindrical shell closed at both ends, coaxial driving and driven shafts projecting through said ends, a conical member coaxial with the shafts adapted to be driven by one of them and axially movable thereto, a helical conical spring surrounding said conical member but anchored at its larger end to said cylindrical shell, and means within the shell for normally maintaining a predetermined axial relation between said conical member and the shaft on which it is slidable.

8. A clutch comprising a cylindrical shell closed at both ends, a shaft coaxial with the shell projecting through one of the ends, a conical member coaxial with the shaft adapted to be driven thereby but axially movable relatively thereto, a helical conical spring loose on said conical member closely adjacent thereto but anchored at its larger end to the shell in the interior thereof, and means within the shell for maintaining a predetermined axial relation between said conical member and said shaft.

9. A clutch comprising a cylindrical shell closed at both ends, a shaft projecting therefrom, a conical member coaxial with the shaft and in variable driving relation thereto, and axially movable thereon, a helical conical spring in the interior of the shell loosely surrounding said conical member but anchored at its larger end to the cylindrical shell in the interior thereof, and means in the interior of the shell for normally maintaining said conical member in spaced relation, as contrasted with gripping relation to said spring.

10. A shell closed at both ends, a shaft projecting from one of the ends of the shell, a cam on said shaft, a conical member loosely slidable on said shaft and adapted to be driven with said shaft by said cam, a conical spring loosely surrounding said conical member and anchored at its larger end to the shell in the interior thereof, and means within the shell adjacent the opposite end for maintaining a predetermined relation between said conical member and said driving cam.

WALTER CHARLES PITTER.